(12) United States Patent
Iwasawa et al.

(10) Patent No.: US 11,233,913 B2
(45) Date of Patent: Jan. 25, 2022

(54) IMAGE FORMING SYSTEM, TERMINAL APPARATUS, SERVER APPARATUS, AND NON-TRANSITORY COMPUTER READABLE MEDIUM STORING PROGRAM

(71) Applicant: FUJI XEROX CO., LTD., Tokyo (JP)

(72) Inventors: Masayuki Iwasawa, Kanagawa (JP); Shingo Kato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 192 days.

(21) Appl. No.: 16/351,538

(22) Filed: Mar. 13, 2019

(65) Prior Publication Data

US 2019/0349482 A1 Nov. 14, 2019

(51) Int. Cl.
*H04N 1/00* (2006.01)
*G06F 3/12* (2006.01)
*G06F 21/60* (2013.01)
*G06F 21/31* (2013.01)

(52) U.S. Cl.
CPC ......... *H04N 1/0048* (2013.01); *G06F 3/1222* (2013.01); *G06F 3/1238* (2013.01); *G06F 21/31* (2013.01); *G06F 21/608* (2013.01)

(58) Field of Classification Search
None
See application file for complete search history.

(56) References Cited

U.S. PATENT DOCUMENTS

| 2005/0114267 A1* | 5/2005 | Miwa | G06F 21/10 |
| | | | 705/59 |
| 2013/0094056 A1* | 4/2013 | Kobayashi | G06F 3/1208 |
| | | | 358/1.15 |
| 2014/0146344 A1* | 5/2014 | Mitsui | G06F 21/608 |
| | | | 358/1.14 |

FOREIGN PATENT DOCUMENTS

| JP | 2013016103 | 1/2013 |
| JP | 2013088869 | 5/2013 |
| JP | 2014106693 | 6/2014 |

* cited by examiner

*Primary Examiner* — Frantz Bataille
(74) *Attorney, Agent, or Firm* — JCIPRNET

(57) ABSTRACT

An image forming system includes a terminal apparatus including a data transmitting unit that transmits data indicating an image formed by an image forming apparatus and necessity information indicating whether authentication information is required for forming the image, to a server apparatus, an identification information storage unit that stores identification information for identifying the data transmitted by the data transmitting unit in a storage unit, an authentication information storage unit that acquires authentication information from a user, with storage of the identification information as a trigger, and stores the acquired authentication information in association with the identification information in the storage unit, and an authentication information transmitting unit that acquires the authentication information from the storage unit and transmits the authentication information to the server apparatus; and the server apparatus including a data receiving unit that receives the data and the necessity information transmitted by the data transmitting unit, an authentication information receiving unit that receives authentication information transmitted from the authentication information transmitting unit, and an output unit that outputs the data and the authentication information to the image forming apparatus, in a case where the necessity information received by the data receiving unit indicates that the authentication information is required.

10 Claims, 8 Drawing Sheets

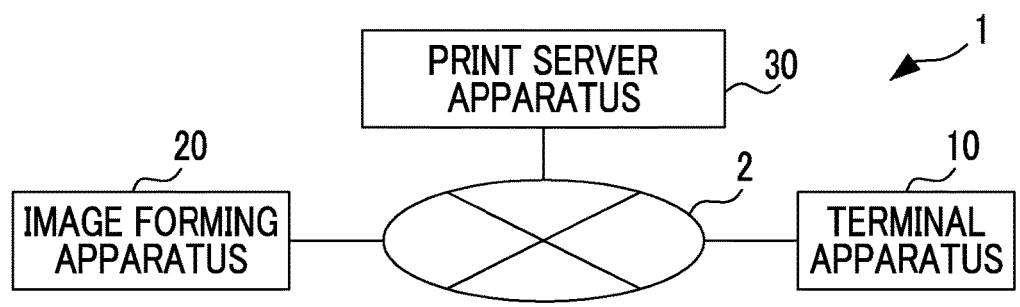
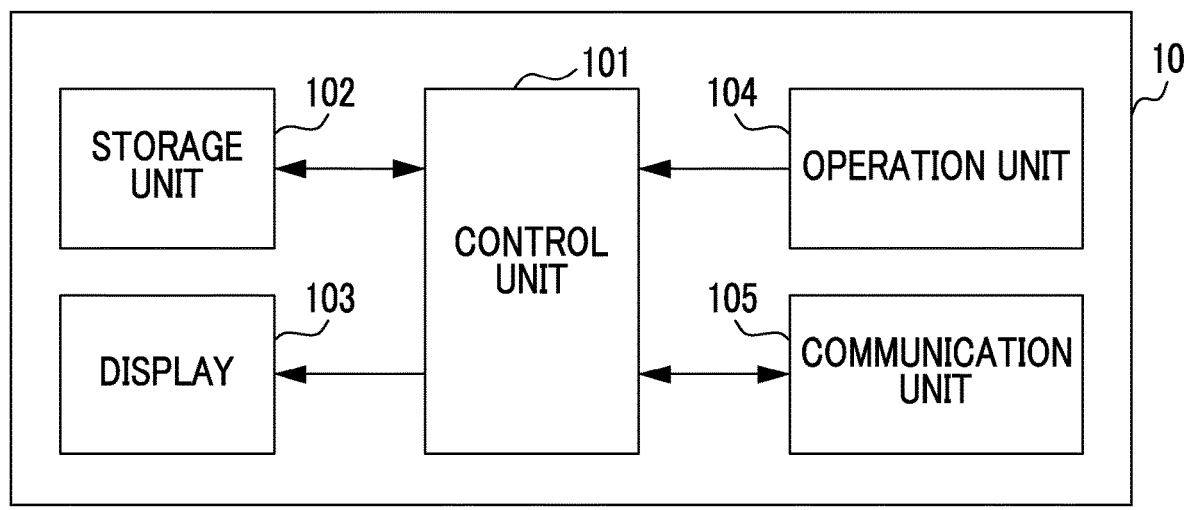

FIG. 8

| PRINT FILE NAME | SAMPLE 1 |

USER ID _____ TB1
PASSWORD _____ TB2

OK   CANCEL

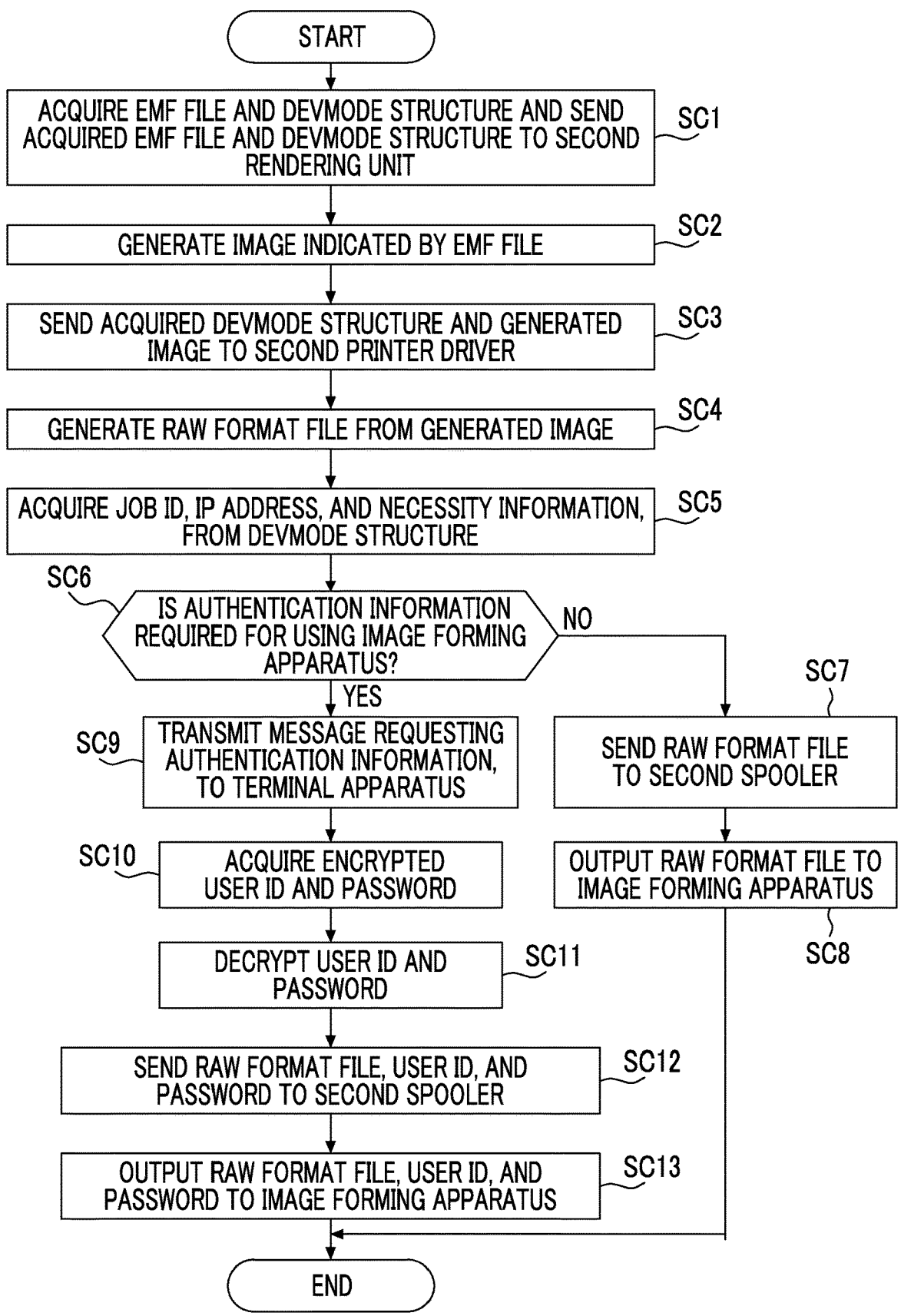

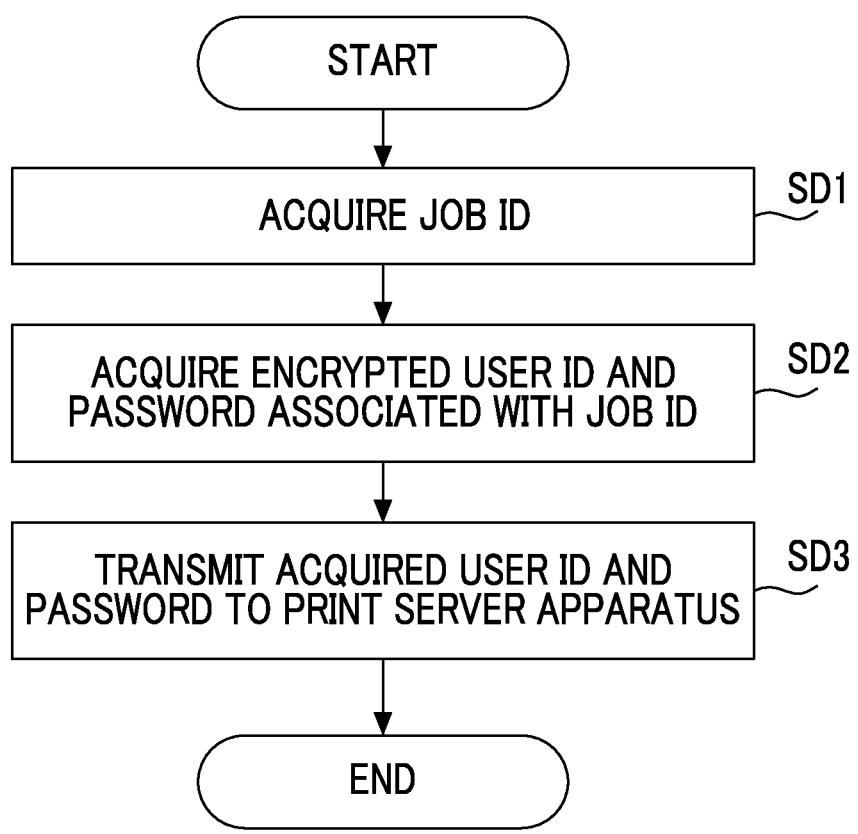

IMAGE FORMING SYSTEM, TERMINAL APPARATUS, SERVER APPARATUS, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-091353 filed May 10, 2018.

BACKGROUND

(i) Technical Field

The present invention relates to an image forming system, a terminal apparatus, a server apparatus, and a non-transitory computer readable medium storing a program.

(ii) Related Art

As an invention of allowing a client to make a printer perform printing, there is an information processing system disclosed in JP2013-016103A, for example. In this system, the printer notifies the client that it is waiting for a password to be input before starting a print job. The client displays the notification, and in a case where the displayed notification is operated, the client activates the Web browser and connects to the printer. The printer connected to the client provides a login screen to the client, and in a case where the user name and the password are input in the Web browser, the printer determines whether the input user name and password are stored or not. In a case where the input user name and password are stored, the printer transmits a list of print jobs to the Web browser, and executes the print job selected in the list.

SUMMARY

In a case of converting the data output by the client into a format that can be processed by the printer (for example, a RAW format), the printer driver may request authentication information such as a predetermined password in order to restrict the use of the printer. In a case where printing requiring such authentication information is performed by a system that performs printing through a print server, in a case of attempting to generate RAW format data on the print server, the printer driver of the print server performs a request for authentication information, and the printer server inputs the authentication information. In a case where the print server inputs the authentication information, it is not conveyed to the user operating the client that the authentication information is requested, and as a result, the authentication information requested by the print server is not input.

Aspects of non-limiting embodiments of the present disclosure relate to an image forming system, a terminal apparatus, a server apparatus, and a non-transitory computer readable medium storing a program, in which authentication information can be obtained from the terminal apparatus in a case where authentication information for authentication is required by the server apparatus located between an image forming apparatus and the terminal apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming system including a terminal apparatus including a data transmitting unit that transmits data indicating an image formed by an image forming apparatus and necessity information indicating whether authentication information is required for forming the image, to a server apparatus, an identification information storage unit that stores identification information for identifying the data transmitted by the data transmitting unit in a storage unit, an authentication information storage unit that acquires authentication information from a user, with storage of the identification information as a trigger, and stores the acquired authentication information in association with the identification information in the storage unit, and an authentication information transmitting unit that acquires the authentication information from the storage unit and transmits the authentication information to the server apparatus; and the server apparatus including a data receiving unit that receives the data and the necessity information transmitted by the data transmitting unit, an authentication information receiving unit that receives authentication information transmitted from the authentication information transmitting unit, and an output unit that outputs the data and the authentication information to the image forming apparatus, in a case where the necessity information received by the data receiving unit indicates that the authentication information is required.

BRIEF DESCRIPTION OF THE DRAWINGS

Exemplary embodiment(s) of the present invention will be described in detail based on the following figures, wherein:

FIG. 1 is a diagram showing apparatuses related to an image forming system 1 according to an exemplary embodiment of the present invention;

FIG. 2 is a diagram showing a hardware configuration of a terminal apparatus 10;

FIG. 8 is a diagram showing an example of a screen displayed on the terminal apparatus 10;

FIG. 9 is a flowchart showing a flow of a process performed by the print server apparatus 30; and FIG. 10 is a flowchart showing a flow of a process performed by the terminal apparatus 10.

DETAILED DESCRIPTION

Exemplary Embodiment

Overall Configuration

Figure 3:
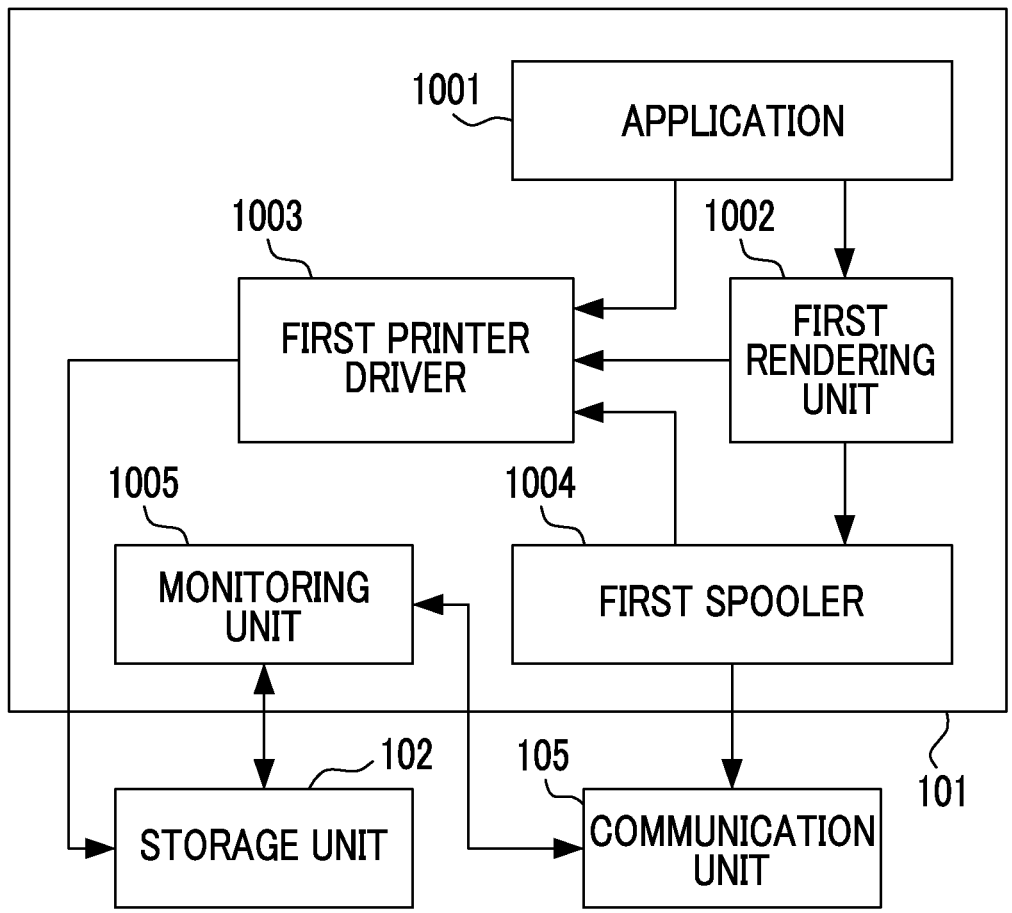
FIG. 3 is a functional block diagram of the terminal apparatus 10.

FIG. 1 is a diagram showing apparatuses related to an image forming system 1 according to an exemplary embodiment of the present invention. A communication line 2 is a communication line through which data communication is performed, and plural computer devices that perform data communication are connected. The communication line 2 includes, for example, a wired local area network (LAN) and a wireless LAN.

An image forming apparatus 20 is connected to the communication line 2 and includes an image forming function of forming an image on a sheet which is a recording medium, a scanning function of reading a document, a copy function, a facsimile function, and the like. The image forming apparatus 20 has an authentication function of authenticating a user registered in advance, and authenticates a user with a user ID and a password, which is authentication information registered in advance. In FIG. 1, a single image forming apparatus 20 is shown, but plural image forming apparatuses 20 can be connected to the communication line 2. The image forming apparatus 20 forms an image on a sheet according to a file sent from the print server apparatus 30 through the communication line 2.

A terminal apparatus 10 which is an example of the terminal apparatus according to the exemplary embodiment of the present invention is an apparatus that performs data communication, and in the present exemplary embodiment, the terminal apparatus 10 is a desktop personal computer. The terminal apparatus 10 is connected to the communication line 2 by wire or wirelessly and performs data communication through the communication line 2. The terminal apparatus 10 transmits a file indicating an image formed by the image forming function of the image forming apparatus 20 to the print server apparatus 30. In the present exemplary embodiment, plural terminal apparatuses 10 can be connected to the communication line 2, but in FIG. 1, only a single terminal apparatus 10 is shown in order to prevent complication of the drawing. In addition, the terminal apparatus 10 is not limited to a desktop personal computer, but may be a laptop personal computer, a tablet terminal, or a smartphone, for example.

The print server apparatus 30 is an example of a server apparatus according to the exemplary embodiment of the present invention. The print server apparatus 30 is connected to the communication line 2 by wire or wirelessly and performs data communication through the communication line 2. The print server apparatus 30 has a so-called print server function, acquires a file sent from the terminal apparatus 10, and instructs the image forming apparatus 20 to form an image indicated by the acquired file through the communication line 2.

Configuration of Terminal Apparatus 10

FIG. 2 is a block diagram illustrating an example of a hardware configuration of the terminal apparatus 10. The display 103 displays texts, graphical user interface (GUI), and the like. The operation unit 104 has a keyboard and a mouse which are input devices, and is operated by the user. The communication unit 105 functions as a communication interface that performs data communication through the communication line 2. The storage unit 102 has, for example, a storage device such as a hard disk device, and stores a program of the operating system, an application program, a file used by the application program, and the like. The control unit 101 includes a central processing unit (CPU) and a memory. The functions realized in the terminal apparatus 10 are realized by causing the CPU to perform an operation by reading a program (software) stored in the storage unit 102 onto hardware such as a CPU and a memory and to perform the control of the storage unit 102, the control of the communication unit 105, and the control of reading and/or writing of data in the memory and the storage unit 102.

Functional Configuration of Terminal Apparatus 10

FIG. 3 is a functional block diagram showing a configuration of a characteristic function according to the exemplary embodiment of the present invention, out of functions realized in the terminal apparatus 10.

An application 1001 is an application having a printing function, and is, for example, a word processor application or a spreadsheet application.

A first rendering unit 1002 is a so-called graphics device interface (GDI). The first rendering unit 1002 generates an EMF format file indicating an image to be formed by the image forming apparatus 20.

A first printer driver 1003 is a program that performs various settings relating to the image forming apparatus 20. The first printer driver 1003 displays a property screen of the image forming apparatus 20 according to the user's operation. On the property screen displayed by the first printer driver 1003, the setting related to image formation such as the size of a sheet on which the image is formed and a color mode, the setting of the format of a file to be spooled, the setting of whether or not authentication information is required for using image forming apparatus 20, and the like can be performed. The authentication information is the above-described user ID and password. The first printer driver 1003 stores information relating to jobs of image formation such as the size of a sheet and the color mode which are set on the property screen, in a DEVMODE structure. Further, the first printer driver 1003 acquires information such as the model name of the image forming apparatus 20 and the hardware option of the image forming apparatus 20 and stores the acquired information in the registry that stores the information on the image forming apparatus 20. Further, in a case of using the image forming apparatus 20 with the printing function of the application 1001, in a case where the authentication information is required for using the image forming apparatus 20, the first printer driver 1003 stores a job ID indicating a file required for image formation and a file name of the file generated by the application 1001 in the above-described registry. The job ID is an example of identification information according to the exemplary embodiment of the present invention.

The first spooler 1004 acquires a file indicating an image formed by the image forming apparatus 20 and a DEVMODE structure and transmits the acquired file and DEVMODE structure to the print server apparatus 30.

In a case of using the image forming apparatus 20 with the printing function of the application 1001, in a case where the authentication information is required for using the image forming apparatus 20, a monitoring unit 1005 acquires authentication information, and stores the acquired authentication information in the above-described registry. Further, the monitoring unit 1005 transmits the authentication information stored in the registry to the print server apparatus 30 in response to a request from the print server apparatus 30. That is, the monitoring unit 1005 transmits the authentication information stored in the registry to the print server apparatus 30, with a request from the print server apparatus 30 as a trigger. The request for authentication information from the print server apparatus 30 is an example of a predetermined trigger according to the exemplary embodiment of the present invention.

Configuration of Print Server Apparatus 30

Figure 4:
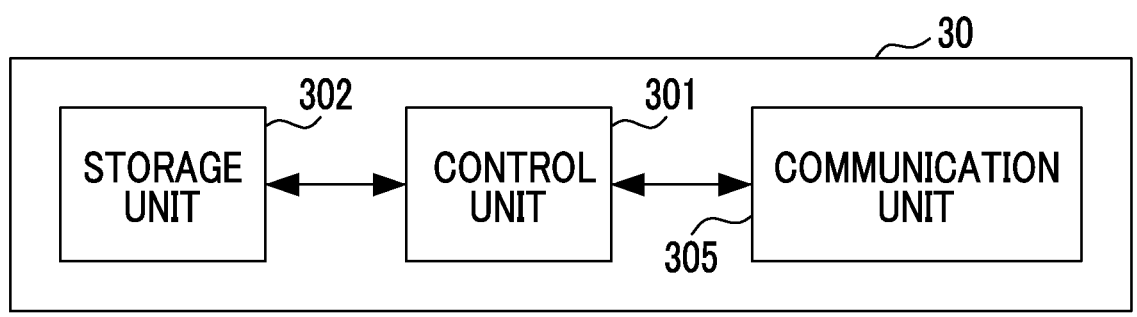
FIG. 4 is a diagram showing a hardware configuration of a print server apparatus 30.

FIG. 4 is a block diagram illustrating an example of a hardware configuration of the print server apparatus 30. A communication unit 305 is a communication interface for performing data communication. The communication unit 305 is connected to the communication line 2 and performs data communication through the communication line 2. A storage unit 302 has a storage device (for example, a hard disk device). The storage unit 302 stores programs executed by the control unit 301 and information used by the executed programs. A control unit 301 has a CPU and a memory. The functions realized in the print server apparatus 30 are realized by causing the CPU to perform an operation by reading a program (software) stored in the storage unit 302 onto hardware such as a CPU and a memory and to perform the control of the storage unit 302, the control of the communication unit 305, and the control of reading and/or writing of data in the memory and the storage unit 302.

Figure 5:
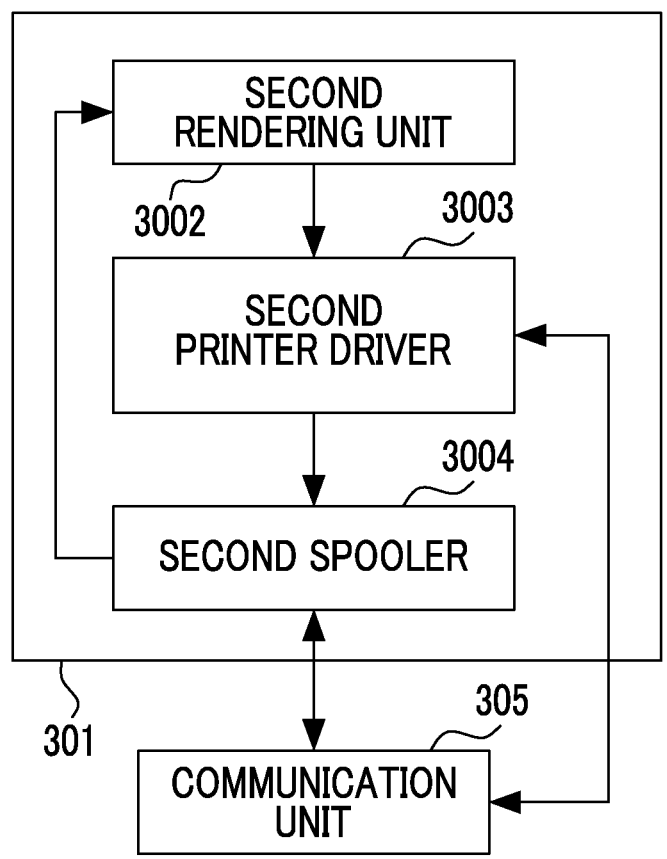
FIG. 5 is a functional block diagram of the print server apparatus 30.

FIG. 5 is a block diagram showing the configuration of the functions according to the exemplary embodiment of the present invention, among the functions realized by the control unit 101 executing a program.

A second rendering unit 3002 is a so-called graphics device interface (GDI). The second rendering unit 3002 acquires an EMF format file and generates an image indicated by the acquired file.

A second printer driver 3003 generates an RAW format file indicating an image to be formed by the image forming apparatus 20 from the image generated by the second rendering unit 3002. Further, in a case where authentication information is required for using the image forming apparatus 20, the second printer driver 3003 requests the authentication information from the terminal apparatus 10, and acquires the authentication information transmitted from the terminal apparatus 10 in response to the request. The second printer driver 3003 is an example of a requesting unit according to the exemplary embodiment of the present invention.

A second spooler 3004 acquires a file transmitted from the terminal apparatus 10 and a DEVMODE structure. The second spooler 3004 outputs the RAW format file generated by the second printer driver 3003 and the authentication information acquired by the second printer driver 3003 to the image forming apparatus 20.

Operation Example of Exemplary Embodiment

Next, the operation of the present exemplary embodiment will be described by taking as an example the operation when outputting the document created by the application 1001 from the image forming apparatus 20.

Figure 6:
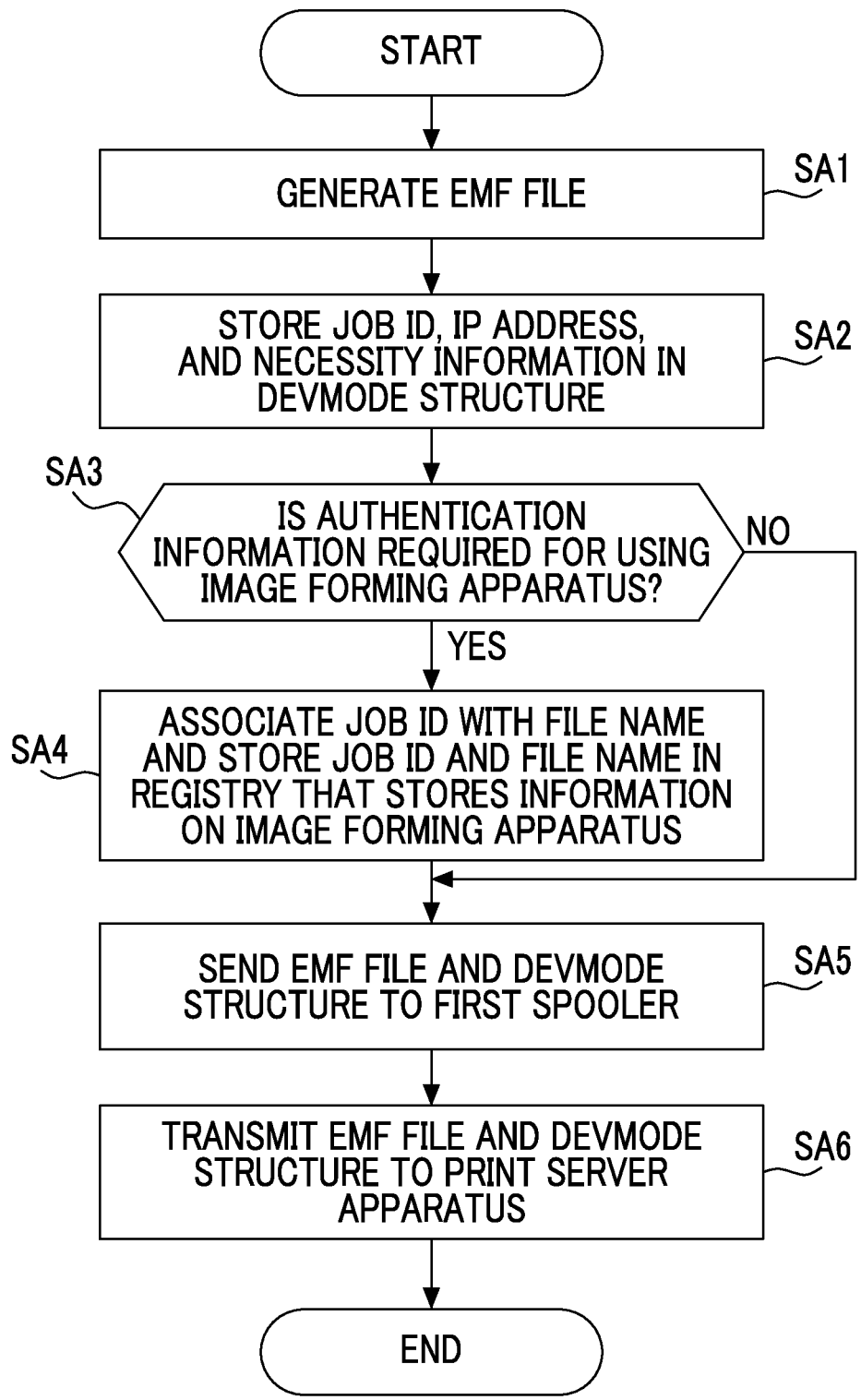
FIG. 6 is a flowchart showing a flow of a process performed by the terminal apparatus 10.

The user operates the application 1001 and performs an operation to instruct printing of the created document. FIG. 6 is a flowchart showing the flow of a process performed by the terminal apparatus 10, in which the operation is performed, in a case where an EMF format file is set as the format of a file to be spooled to the first spooler 1004.

In a case where the user performs an operation to instruct printing with the application 1001, in a case where a file of an EMF format is set as the format of a file to be spooled to the first spooler 1004, the first rendering unit 1002 generates a file of an EMF format (hereinafter referred to as an EMF file) indicating the document created by the user (step SA1).

Next, the first printer driver 1003 stores the job ID indicating the generated EMF file, the IP address of the terminal apparatus 10, and the necessity information indicating whether authentication information is required for using the image forming apparatus 20, in the DEVMODE structure (step SA2). Here, in a case of a setting requiring authentication information for using the image forming apparatus 20, the first printer driver 1003 stores the necessity information indicating that authentication information is required for using the image forming apparatus 20 in the DEVMODE structure, and in a case of a setting not requiring authentication information for using the image forming apparatus 20, the first printer driver 1003 stores the necessity information indicating that authentication information is not required for using the image forming apparatus 20 in the DEVMODE structure. In addition, these pieces of information are stored in an extended area that the first printer driver 1003 can independently use in the DEVMODE structure.

Next, the first printer driver 1003 determines whether or not authentication information is required for using the image forming apparatus 20 (step SA3). In a case where authentication information is not required for using the image forming apparatus 20, the first printer driver 1003 moves the flow of the process to step SA5. In a case where authentication information is required for using the image forming apparatus 20, the first printer driver 1003 associates the job ID indicating the EMF file generated by the first rendering unit 1002 with the file name of the file of the document generated by the application 1001 and stores the job ID and the file name in the registry that stores the information on the image forming apparatus 20 (step SA4). The first printer driver 1003 is an example of an identification information storage unit according to the exemplary embodiment of the present invention.

Next, the first printer driver 1003 sends the EMF file generated by the first rendering unit 1002 and the DEVMODE structure to the first spooler 1004 (step SA5). The first spooler 1004 transmits the EMF file and the DEVMODE structure sent from the first printer driver 1003 to the print server apparatus 30 (step SA6). The first spooler 1004 is an example of a data transmitting unit according to the exemplary embodiment of the present invention.

Figure 7:
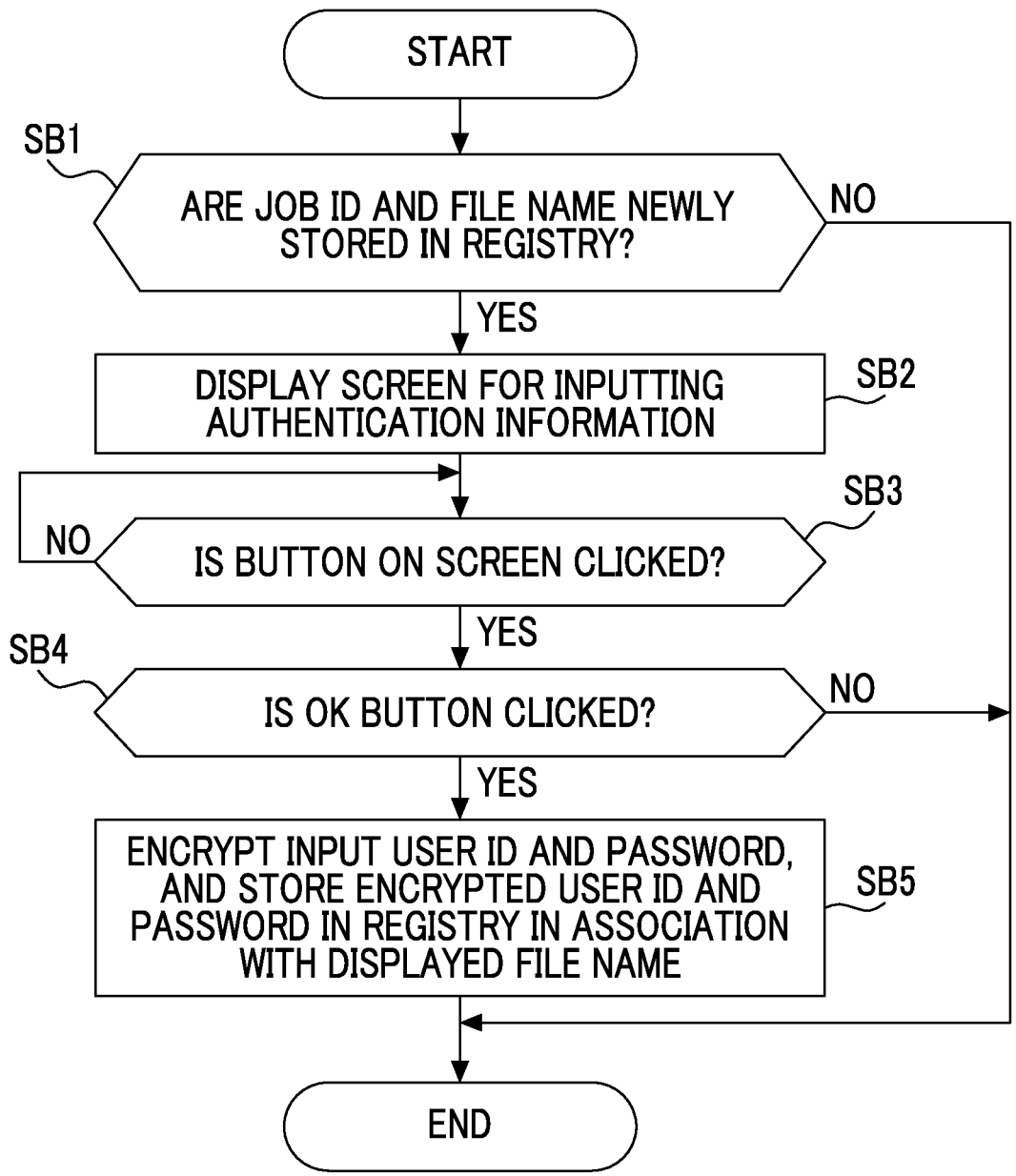
FIG. 7 is a flowchart showing a flow of a process performed by the terminal apparatus 10.

FIG. 7 is a flowchart showing a flow of a process performed by the monitoring unit 1005 of the terminal apparatus 10 at predetermined intervals. The monitoring unit 1005 determines whether or not a job ID and a file name are newly stored in the above-described registry (step SB1). In a case where the job ID and the file name are not newly stored in the above-described registry (NO in step SB1), the monitoring unit 1005 ends the process of FIG. 7.

Figure 8:
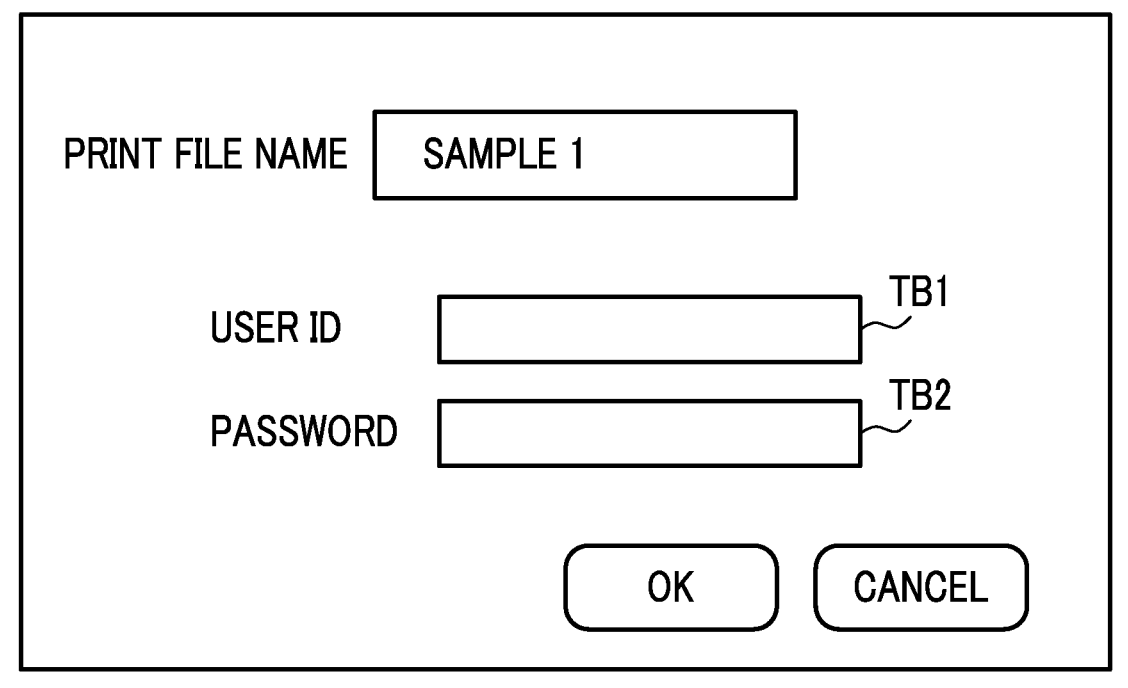

In a case where the job ID and the file name are newly stored in the above-described registry (YES in step SB1), the monitoring unit 1005 displays a screen for inputting authentication information (step SB2). FIG. 8 is a diagram showing an example of a screen displayed by the terminal apparatus 10 in step SB2. The monitoring unit 1005 acquires the file name stored in the above-described registry and displays the acquired file name on a screen for inputting authentication information. The user inputs his or her own user ID in a text box TB1 of the displayed screen and inputs his or her own password in a text box TB2 of the displayed screen.

Next, the monitoring unit 1005 determines whether or not the button on the screen is clicked (step SB3). In a case where the button on the screen is not clicked (NO in step SB3), the monitoring unit 1005 returns the flow of the process to the state before step SB3.

In a case where the button on the screen is clicked (YES in step SB3), the monitoring unit 1005 determines whether or not an OK button is clicked (step SB4). In a case where a cancel button is clicked (NO in step SB4), the monitoring unit 1005 ends the process of FIG. 7.

In a case where the OK button is clicked (YES in step SB4), the monitoring unit 1005 acquires and encrypts the user ID and password input on the screen and stores the encrypted user ID and password in the above-described registry in association with the displayed file name (step SB5). Here, since this file name is associated with the job ID in the registry, the job ID, the file name, and the encrypted user ID and password are associated with each other and stored in the registry. The monitoring unit 1005 is an example of an authentication information storage unit according to the exemplary embodiment of the present invention.

Next, an operation example of the print server apparatus 30 will be described. The print server apparatus 30 receives the EMF file and DEVMODE structure transmitted by the terminal apparatus 10. FIG. 9 is a flowchart showing the flow of a process performed when the print server apparatus 30 receives the EMF file and the DEVMODE structure.

The second spooler 3004 acquires the EMF file and DEVMODE structure received by the communication unit 305, and sends the acquired EMF file and DEVMODE structure to the second rendering unit 3002 (step SC1). The second spooler 3004 is an example of a data receiving unit according to the exemplary embodiment of the present invention. The second rendering unit 3002 generates an image indicated by the EMF file sent from the second spooler 3004 (step SC2), and sends the generated image and the acquired DEVMODE structure to the second printer driver 3003 (step SC3). The second printer driver 3003 generates a RAW format file by using the image sent from the second rendering unit 3002 (step SC4).

Next, the second printer driver 3003 acquires the job ID, the IP address of the terminal apparatus 10, and the necessity information, from the extended area of the DEVMODE structure sent from the second rendering unit 3002 (step SC5), and determines whether or not the acquired necessity information indicates that authentication information is required for using the image forming apparatus 20 (step SC6). In a case where the acquired necessity information indicates that authentication information is not required for using the image forming apparatus 20 (NO in step SC6), the second printer driver 3003 sends the generated RAW format file to the second spooler 3004 (step SC7). The second spooler 3004 outputs the RAW format file sent from the second printer driver 3003 to the image forming apparatus 20 (step SC8).

In a case where the acquired necessity information indicates that authentication information is required for using the image forming apparatus 20 (YES in step SC6), the second printer driver 3003 transmits a message requesting authentication information, including the acquired job ID, to the terminal apparatus 10 of the acquired IP address (step SC9).

FIG. 10 is a flowchart showing the flow of the process performed by the terminal apparatus 10 that has received the message transmitted in step SC9. In a case of acquiring the message transmitted in step SC9, the monitoring unit 1005 acquires the job ID included in the acquired message (step SD1). The monitoring unit 1005 that has acquired the job ID acquires the encrypted user ID and password associated with the acquired job ID from the above-described registry (step SD2), and transmits the acquired user ID and password to the print server apparatus 30 (step SD3). The monitoring unit 1005 is an example of an authentication information transmitting unit according to the exemplary embodiment of the present invention.

Returning to FIG. 9, the second printer driver 3003 acquires the user ID and password transmitted from the terminal apparatus 10 as a response to the message transmitted in step SC9 (step SC10). The second printer driver 3003 is an example of an authentication information receiving unit according to the exemplary embodiment of the present invention. Since this user ID and the password are encrypted, the second printer driver 3003 decrypts the acquired user ID and password (step SC11).

Next, the second printer driver 3003 sends the generated RAW format file and the user ID and password obtained by the decryption to the second spooler 3004 (step SC12). The second spooler 3004 outputs the RAW format file, user ID and password sent from the second printer driver 3003, to the image forming apparatus 20 (step SC13). The second printer driver 3003 is an example of an output unit according to the exemplary embodiment of the present invention.

The image forming apparatus 20 acquires the RAW format file, user ID and password output from the print server apparatus 30. In a case where a set of the acquired user ID and password is registered in the image forming apparatus 20 in advance, the image forming apparatus 20 forms an image indicated by the acquired RAW format file on the recording medium.

Modification Example

Although the exemplary embodiment of the present invention has been described above, the present invention is not limited to the above-described exemplary embodiment, and can be implemented in various other modes. For example, the present invention may be implemented by modifying the above-described exemplary embodiment as follows. Note that the above-described exemplary embodiment and the following modification example may be combined.

In the above-described exemplary embodiment, the terminal apparatus 10 transmits the encrypted user ID and password to the print server apparatus 30 in response to a request from the print server apparatus 30, but the configuration of transmitting the encrypted user ID and password to the print server apparatus 30 is not limited to the configuration of the exemplary embodiment. For example, in a case where the OK button is clicked after the user ID and the password are input on the screen of FIG. 8, the monitoring unit 1005 may encrypt the input user ID and password and transmit the job ID stored in the above-described registry, and the encrypted user ID and password to the print server apparatus 30. In the present modification example, the second printer driver 3003 of the print server apparatus 30 acquires the job ID transmitted from the terminal apparatus 10, the encrypted user ID and password. The second printer driver 3003 decrypts the encrypted user ID and password. In a case where the job ID included in the DEVMODE structure sent from the second rendering unit 3002 matches the job ID acquired together with the user ID and the password, the second printer driver 3003 sends the generated RAW format file and the decrypted user ID and password to the second spooler 3004, and the second spooler 3004 outputs the RAW format file and the user ID and password to the image forming apparatus 20.

In the exemplary embodiment of the present invention, the image forming apparatus 20 may notify the print server apparatus 30 of the result of authentication based on the user ID and password. Further, the print server apparatus 30 may transmit a notification of the authentication result sent from the image forming apparatus 20 to the terminal apparatus 10, and the terminal apparatus 10 may display the authentication result indicated by the received notification. In a case where the notification of the authentication result is a notification indicating that the authentication has been rejected, the terminal apparatus 10 performs the process after step SB2 in FIG. 7, acquires the user ID and password again, and retransmit the EMF file and the DEVMODE structure.

In this modification example, the print server apparatus 30 includes a result acquisition unit that acquires the result of authentication and a notification unit that notifies the terminal apparatus 10 of the result of authentication, and the terminal apparatus 10 includes a notification acquisition unit that acquires the notification of the result of authentication, and informing unit that informs the user of the content of the notification of the result of authentication.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
a terminal apparatus comprising a first processor configured to:
transmit data indicating an image formed by an image forming apparatus and necessity information, other than authentication information, indicating whether the authentication information is required for forming the image, to a server apparatus,
store identification information for identifying the data transmitted in a memory of the terminal apparatus,
acquire authentication information from a user, with storage of the identification information as a trigger, and store the acquired authentication information in association with the identification information in the memory of the terminal apparatus, and
acquire the authentication information from the memory of the terminal apparatus and transmit the authentication information to the server apparatus; and
the server apparatus comprising a second processor configured to:
receive the data and the necessity information transmitted by the first processor,
receive authentication information transmitted from the first processor, and
output the data and the authentication information to the image forming apparatus, in a case where the necessity information received indicates that the authentication information is required.

2. The image forming system according to claim 1, wherein the first processor transmits the authentication information, at a predetermined trigger.

3. The image forming system according to claim 2, wherein the second processor requests the authentication information in a case where the necessity information received indicates that authentication information is required, and
wherein the first processor transmits the authentication information, with a request from the second processor as the trigger.

4. The image forming system according to claim 2, wherein the trigger is acquisition of the authentication information from the user.

5. The image forming system according to claim 1, wherein the second processor acquires a result of authentication based on the authentication information from the image forming apparatus.

6. The image forming system according to claim 5, wherein the second processor notifies the terminal apparatus that the authentication is rejected, in a case where the result is a rejection of authentication, and
wherein the terminal apparatus is further configured to:
acquire the notification, and
inform the user that the authentication is rejected, in response to the acquisition of the notification.

7. The image forming system according to claim 6, wherein the first processor reacquires the authentication information from the user in response to the acquisition of the notification.

8. A terminal apparatus comprising a processor configured to:
transmit data indicating an image formed by an image forming apparatus and necessity information, other than authentication information, indicating whether the authentication information is required for forming the image, to a server apparatus;
store identification information for identifying the data transmitted in a memory of the terminal apparatus;
acquire authentication information from a user, with storage of the identification information as a trigger, and store the acquired authentication information in association with the identification information in the memory of the terminal apparatus; and
acquire the authentication information from the memory of the terminal apparatus and transmit the authentication information to the server apparatus.

9. A non-transitory computer readable medium storing a program, causing a computer to:
transmit data indicating an image formed by an image forming apparatus and necessity information, other than authentication information, indicating whether the authentication information is required for forming the image, to a server apparatus;
store identification information for identifying the data transmitted in a memory of the computer;
acquire authentication information from a user, with storage of the identification information as a trigger, and store the acquired authentication information in association with the identification information in the memory of the computer; and
acquire the authentication information from the memory of the computer and transmit the authentication information to the server apparatus.

10. A server apparatus comprising a processor configured to:
receive data indicating an image formed by an image forming apparatus and necessity information, other than authentication information, indicating whether the authentication information is required for forming the image, from a terminal apparatus;
receive authentication information transmitted from the terminal apparatus; and
output the data and the authentication information to the image forming apparatus, in a case where the necessity information received indicates that the authentication information is required.

* * * * *